Figure 1:
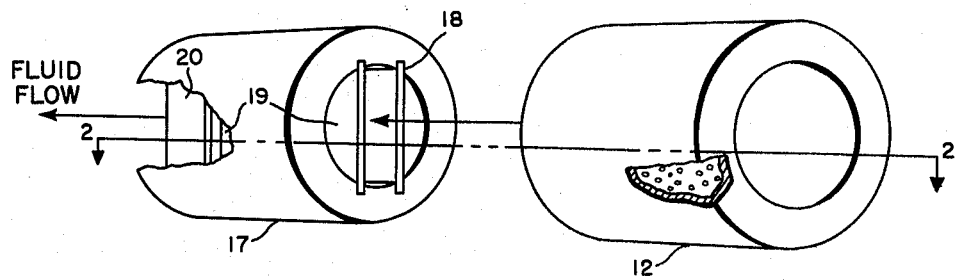

July 5, 1966 N. A. ZESSOULES 3,258,964
MASS FLOW METER
Filed Oct. 28, 1963

INVENTOR.
NICHOLAS A. ZESSOULES
BY Robert S. Toperzer
atty.

United States Patent Office 3,258,964
Patented July 5, 1966

3,258,964
MASS FLOW METER
Nicholas A. Zessoules, Newton Highlands, Mass., assignor to Laboratory for Electronics, Inc., Boston, Mass., a corporation of Delaware
Filed Oct. 28, 1963, Ser. No. 319,318
6 Claims. (Cl. 73—194)

This invention relates generally to the measurement of the flow rate of fluids and, more patricularly, it is concerned with a device for measuring mass flow as opposed to volumetric flow.

There are currently available a number of different types of flow meters, each of which is uniquely adapted to meet a particular service requirement or set of requirements. The type of fluid to be metered, the amount of space available, and the range of flow rates to be encountered, are just a few examples of the factors which influence the choice of a particular type of flow meter. Most conventional flow meter types are not well adapted to measure flow rate in terms of mass rather than volume, however, and in many applications such as rocket fueling, the rate of mass flow is the most important. To measure mass flow hitherto, the usual practice has been to measure the density or mass of the fluid independently of the volumetric flow rate and then to modify the measurement of the volumetric flow rate as a function of fluid density. This approach is not only cumbersome, but oftentimes it is ill-suited to the particular environment in which the device is used. For example, cryogenic and highly corrosive fluids cannot be conveniently measured by this method because flow meters for measuring volumetric flow rates usually include some kind of movable element disposed in the flow path of the fluid.

The general object of the present invention, therefore, is to provide a more suitable device for measuring the flow rate of a fluid in terms of its mass.

A more specific object is to provide a mass flow meter, which measures mass flow directly.

Another object is to provide a mass flow meter which has no moving parts.

Another object is to provide a mass flow meter which does not obstruct, appreciably, the passage of the fluid.

Another object is to provide a mass flow meter which is suitable for use in very small flow chambers.

Still another object is to accomplish the foregoing objects without sacrifice to such obvious requirements as ruggedness, precision, cost, and reliability.

In brief, the device according to the present invention makes use of a radioactive source to partially ionize the fluid, and a flow chamber, provided with a pair of parallel plates extending longitudinally of the chamber. One of the plates is divided into two sections, a forward section and a rearward section, which are electrically insulated. The full length plate and the forward section of the divided plate, are connected to a source of variable direct voltage, and the field created by this voltage serves to deflect ions toward the divided plate. When the voltage is low, few ions are deflected sufficiently to strike either the forward or rearward section of the divided plate. When the voltage is high, most of the ions are deflected so sharply that they are all collected by the forward plate section. At some voltage value in between, however, most of the ions are collected by the rearward section and it is this value of voltage from which an indication of mass flow is derived. More specifically, it will be shown that mass flow rate is proportional to the value of voltage causing a maximum ion current to flow by way of the rearward plate section.

The novel features of the invention, together with further objects and advantages thereof, will become more readily apparent from the following detailed description of a preferred embodiment and from the accompanying drawing to which the description refers. In the drawing, FIG. 1 is a perspective view of a device according to the invention with portions cut away to reveal its inner structure more clearly.

Figure 2:
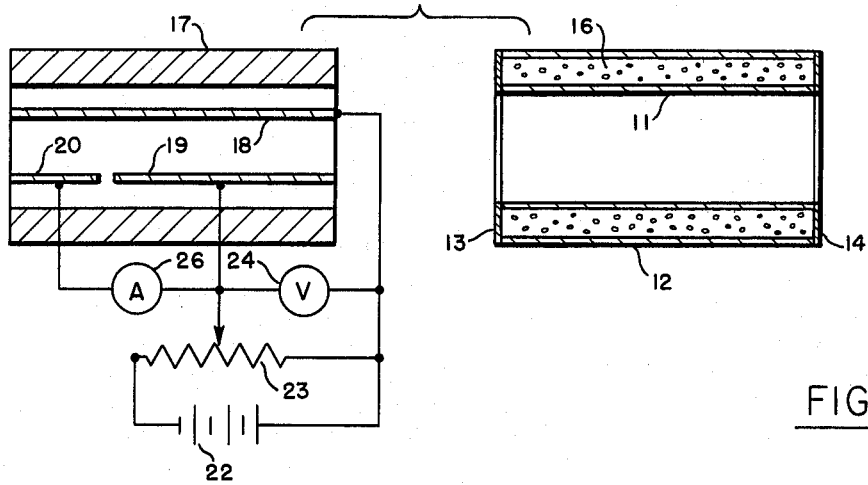
Figure 3:
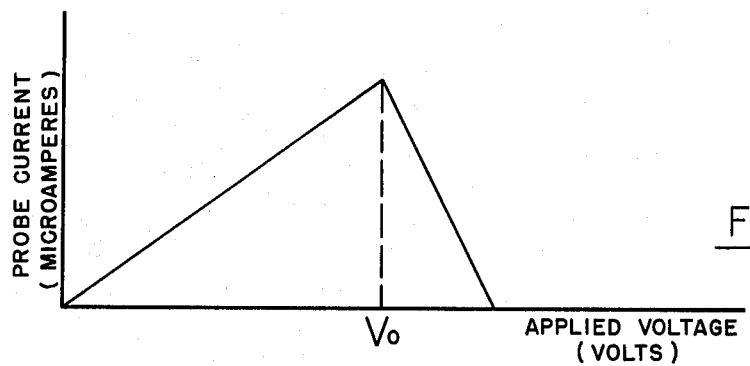

FIG. 2 is a plan view of the device with an accompanying schematic of the external circuitry associated therewith; and FIG. 3 is a graph illustrating the functional relation between deflection voltage and collector current.

With reference now to the drawing, and more particularly to FIGS. 1 and 2, it will be observed that the device according to the invention incorporates two serially connected flow chambers or conduits through which the fluid passes from right to left in the drawing. To form the first chamber, which is used to create ions in the fluid, there are provided a pair of hollow cylindrical members 11 and 12 which are positioned concentrically with respect to one another. Annular end plates 13 and 14 serve to support the members in this position and to close off the annular space or jacket defined thereby. Within the annular space, there is provided a radio-active gas 16, such as Krypton 85, which emits ionizing radiation primarily in the form of beta rays. This radiation passes through the walls of inner member 11 and interacts with the fluid flowing through the chamber. It is preferred to construct the chamber entirely of metal in order to minimize stray radiation.

Forming the second conduit or flow chamber through which the fluid passes is a hollow cylindrical member 17 of insulating material, such as glass. Inside this chamber are a pair of parallel plates extending in planes parallel to the axis of member 17, that is, in the direction of the flow of the fluid. One of the plates 18 is seen to extend for substantially the full distance of the chamber. The other plate is divided into two electrically insulated sections, a forward section 19 and a rearward section 20. Preferably the longitudinal dimension of the forward section 19 is significantly greater than that of the rearward section.

The plates are adapted to serve as electrodes and to this end, a source of direct voltage 22 is connected to the input terminals of a potentiometer 23 and the output terminals of the potentiometer 23 are connected between full length plate 18 and plate section 19. Also a voltmeter 24 is provided to measure the output voltage of the potentiometer. The rearward plate section 20 is connected in circuit with the forward section 19 by means of a current measuring device or meter 26 which indicates the rate at which ions are collected by the rearward section. This device may take the form of an electrometer of a type well known to those skilled in the art.

In operation, after the fluid to be metered is at least partially ionized by the radioactive gas in the first chamber, it comes under the influence of the electric field created by the voltage between electrodes 18 and 19 in the second chamber. As a result, positive ions are deflected away from the flow path, that is, away from the stream lines parallel to the axis of the chamber, and toward the negative electrode 19. With a relatively low voltage, the curvature of the ion tracks is insufficient to bring them into contact with either electrode 19 or 20. As the applied voltage is increased, however, some of the ions will be deflected more sharply and thereby caused to impinge upon and be collected by electrode 20, the rate at which the ions are collected being indicated by meter 26.

FIG. 3 shows the relation between applied voltage and ion collection rate or current at electrode 20 as indicated by the meter 26. From FIG. 3 it will be observed that the current increases linearly with applied voltage until a critical value of voltage $V_0$ is reached. At this point the current is a maximum and decreases rather rapidly with any further increase in voltage. This is because many of the ions are deflected sufficiently to strike electrode 19 instead of electrode 20.

To demonstrate the dependence of the voltage $V_0$ on the mass flow rate, it can be postulated from the geometry of the electrodes that the maximum current at electrode 20 is produced when most ions entering the chamber are deflected sufficiently to strike the downstream end of electrode 20. Under these circustances, the time for an ion to negotiate the longitudinal distance from the forward end of electrode 19 donwstream to the rearward end of electrode 20 becomes equal to the time required for the same ion to traverse the distance separating electrodes 18 and 20. Mathematically this means that:

$$\frac{L}{F}=\frac{S^2}{\mu V_0} \text{ or } V_0=\frac{S^2 F}{\mu L} \qquad (1)$$

where

F is the volumetric flow rate (cm.³/sec.)
$\mu$ is the ion mobility (cm.²/volt.-sec.)
$V_0$ is the critical voltage corresponding to the maximum current at the rearward electrode (volts)
L is the volume of the flow chamber (cm.³) and
S is the spacing of electrode 19 (and electrode 20) from electrode 18 (cm.)

It is well established that over a wide range, ion mobility is inversely proportional to the density of the fluid medium; or:

$$\mu=\frac{\mu_0}{p} \qquad (2)$$

where $\mu_0$ is the mobility constant,
p is the density of the medium

By substitution in Equation 1 from Equation 2:

$$V_0=\frac{S^2(pF)}{\mu_0 L}=K(pF)$$

It is seen that the mass flow rate is proportional to the value of the voltage $V_0$ causing a maximum current at electrode 20. Hence, by adjustment of the potentiometer 23, with reference to current meter 26, the critical value of voltage $V_0$ is established and the mass flow rate determined. This operation can, of course, be carried out automatically by maximum signal seeking circuitry and, in fact, it is preferred to use such circuitry in practice even though it has not been shown. The reason it has not been shown is that such circuitry is wholly unrelated to the principles of the invention and may be entirely conventional.

An example of the details of construction of a device according to the invention, which has been built, is as follows. The first chamber containing the radioactive gas was 1.25" long with an inner diameter of ⅝" and an outer diameter of 1". Members 11–14 were of Monel metal, and inner member 11, which is adapted to serve in effect as a window, was 0.0012" thick. An activity level for the gas of approximately 500 millicuries was found to be sufficient to produce the necessary ionization of the fluid.

The second chamber was approximately 1" long with electrode 19 extending for approximately ¾ of this distance and electrode 20 the remaining distance. A spacing between electrodes 18 and 19 (or 20) of approximately ½" has been found to work out well in practice and with this spacing the critical value of voltage, $V_0$, was approximately 900 volts and the measured current was approximately $9 \times 10^{-11}$ amps. at a flow velocity of approximately 20 centimeters per second.

Although the invention has been described in terms of a single preferred embodiment, it will be appreciated that various modifications of this embodiment that are within the spirit and scope of the invention are possible. For example, other types of nuclear sources, or for that matter, non-nuclear means such as an electric field, can be used to ionize the fluid to be metered. Morever, the principles of the invention can be extended to electrode configurations different from the one described. Therefore, the invention should not be deemed to be limited to the details of what has been described herein by way of illustration, but rather it should be deemed to be limited only by the scope of the appended claims.

What is claimed is:

1. A mass flow meter comprising: means for creating ions in the fluid whose mass flow rate is to be metered; means to deflect said ions relative to the direction of flow of the fluid; first means to collect ions having deflections within a predetermined limited range; second ion collection means to collect ions which have been deflected more sharply than the ions collected by said first-named ion collection means; means to determine the rate at which the ions are collected by said first ion collection means; means to vary the strength of said deflection means and thereby maximize the ion collection rate; and means to indicate the mass flow rate of the fluid in terms of the strength of said deflection means causing said maximum ion collection rate.

2. The device according to claim 1 wherein said means for creating ions comprises a container of radioactive gas disposed adjacent to the flow path of the fluid.

3. The device according to claim 1 wherein said deflection means comprises first and second electrodes adapted to produce an electric field acting transversely of the flow path of the fluid.

4. The device according to claim 3 wherein said collection means includes a third electrode located downstream of at least one of said first-named pair of electrodes.

5. The device according to claim 4 wherein said means to determine the rate in which the ions are collected includes a current sensitive device connected in circuit between said first and third electrodes.

6. A mass flow meter comprising: a source of radioactivity for creating ions in the fluid whose mass flow is to be metered; a flow chamber for the fluid, a first electrode extending generally longitudinally of said flow chamber for a predetermined distance; a second electrode transversely spaced from said first electrode, said second electrode extending longitudinally of said conduit for part of said predetermined distance; a third electrode transversely spaced from said first electrode and longitudinally spaced from said second electrode, said third electrode extending generally longitudinally of said chamber for another part of said predetermined distance; a source of variable voltage applied between said first and second electrodes; a voltage measuring device to measure the value of said variable voltage and a current measuring device connected in circuit with said voltage source between said first and third electrodes to measure the rate at which ions are collected by said third electrode.

References Cited by the Examiner

UNITED STATES PATENTS

| 2,627,543 | 2/1953 | Obermaier | 73—194 |
| 2,861,452 | 11/1958 | Morgan | 73—194 |
| 2,933,924 | 4/1960 | Jenks | 73—194 |

RICHARD C. QUEISSER, *Primary Examiner.*

L. R. FRANKLIN, *Assistant Examiner.*